May 20, 1924.

E. FULTS ET AL

CUTTER FOR CAKES AND COOKIES

Filed May 22, 1922

1,494,898

E. Fults.
C. A. Bates.
INVENTOR:

Victor J. Evans
ATTORNEY

WITNESS

Patented May 20, 1924.

1,494,898

UNITED STATES PATENT OFFICE.

EDWIN FULTS AND CLARENCE A. BATES, OF CANASTOTA, NEW YORK.

CUTTER FOR CAKES AND COOKIES.

Application filed May 22, 1922. Serial No. 562,732.

*To all whom it may concern:*

Be it known that we, EDWIN FULTS and CLARENCE A. BATES, citizens of the United States, residing at Canastota, in the county of Madison and State of New York, have invented new and useful Improvements in Cutters for Cakes and Cookies, of which the following is a specification.

This invention relates to a device for cutting dough in the process of making cakes and the like, and the object is to provide, in connection with a cylindrical cutter, a particular form of dough removing device.

A further object is to provide a detachable cutter and particular means for connecting the latter with the main cutting device.

A still further object is to provide a cylindrical cutter and a plurality of handles and connecting devices therefor, one of the handles being employed when cutting the dough, and the handles being relatively movable when removing the dough cut in the form desired, from the cutter.

With the foregoing and other objects in view, the invention consists in the novel construction and arrangement of elements described and claimed, it being understood that modifications may be made within the scope of the claims, without departing from the spirit of the invention.

Figure 1:
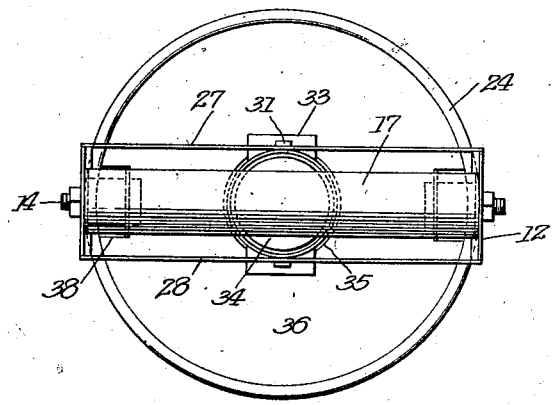
Figure 2:
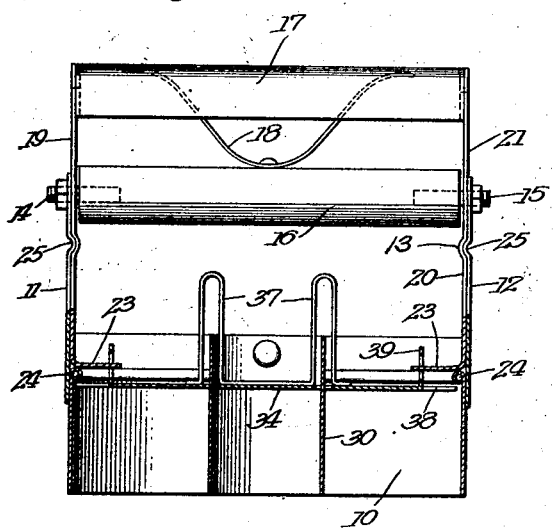
Figure 3:
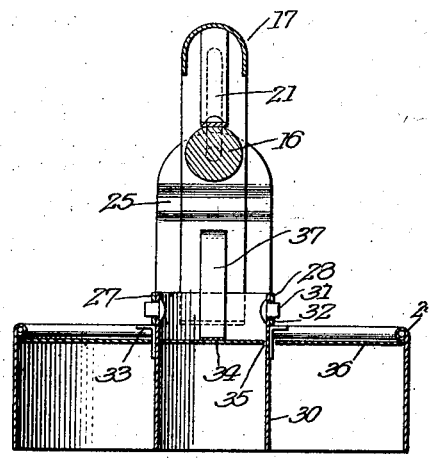
Figure 4:
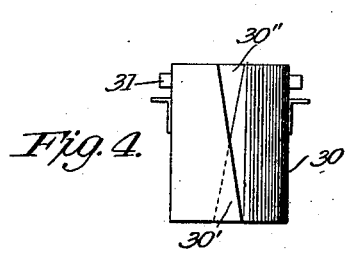

In the drawings, Figure 1 is a top plan view of the device; Figure 2 is a view in vertical section, with parts in elevation; Figure 3 is a vertical section from another angle; Figure 4 shows the central cutting element, having the form of a split sleeve.

In carrying out the invention, we employ a cylindrical cutter 10 having rigidly connected therewith vertical strips 11 and 12 indented as shown at 13. The upper ends of these strips are connected by screws 14 and 15 with transverse handle 16.

An upper handle 17 of inverted channel form, is separated from handle 16 by U-shaped spring 18, and rigidly connected with the upper handle are strips 19 and 20 slotted as shown at 21. The slots permit of the free movement of screws 14 and 15 connected with handle 16, and therefore permit of the relative movement of the handles.

The lower ends of strips 19 and 20 are inwardly turned at 23 and engage the upper rolled portion 24 of the cylindrical cutter 10, so that pressure on handle 17 produces pressure on the cutter.

Indentations 25 in strips 19 and 20 cooperating with the corresponding portion 13 in strips 11 and 12 produce resilient engagement.

Transverse parallel strips 27 and 28 mounted as shown, and between these elements is supported a small cutter 30 having lugs 31 thereon for engagement with apertures 32 in the bars or strips just referred to. Angle members 33 engage the edges of said strips or bars in the manner shown. The element 30 cuts holes in the center of the disk of dough separated by the large cutter 10. Element 30 is similar to a split sleeve having overlapping portions 30' and being cut away at 30''.

Within cutter 30 is a disk or plate 34 spaced from the edges of the opening 35 in the outer plate 36, these plates being held in the position specified by the looped element 37. Large plate 36 is provided with cutaway portions 38 and upturned portions 39, the cutaway portions being slotted and receiving elements 23 of strips 19 and 20.

Pressure applied to handle 17 is transmitted through elements 23 to the cutter, as previously stated, for cutting the cakes or cookies. When removing the dough from the cutter the palm of the hand remains in engagement with the handle 17, and the fingers produce upward pressure on handle 16 for effecting disengagement at 13. While being disengaged, strips 19 and 20 move inwardly far enough to clear the rolled edge of the cutter 10. The handles 16 and 17 moving toward each other, caused relative movement between the cutters and the plates 34 and 36, releasing the dough cut in the form desired.

Having thus described the invention, what is claimed is:

1. In a device of the class described, a cylindrical cutter, a handle therefor, a second handle extending alongside of that first named, means connected with the second handle for engaging the upper edge of the cutter, a dough removing device associated with said means, the dough removing device and cutter being relatively movable.

2. In a device of the class described, a cylindrical cutter, a handle therefor, a second handle extending alongside of that first named, means connected with the second handle for engaging the upper edge of the cutter, a dough removing device associated with said means, the dough removing device and cutter being relatively movable, and a second cutter detachably mounted within that first named.

3. In a device of the class described a cylindrical cutter, a handle therefor, a second handle extending alongside of that first named, means connected with the second handle for engaging the upper edge of the cutter a dough removing device associated with said means, the dough removing device and cutter being relatively movable, a second cutter detachably mounted within that first named, and a dough removing device for the second cutter.

4. In a device of the class described, a cylindrical cutter, a handle, strips connecting the handle and cutter, a second handle, strips connected with the second handle, cutter engaging devices carried by the strips last named, and a dough removing plate within the cutter and carrying engaging devices cooperating with those first named, the plate and cutter being relatively movable.

5. In a device of the class described, a cylindrical cutter, a handle, strips connecting the handle and cutter, a second handle, strips connected with the second handle, cutter engaging devices carried by the strips last named, and a dough removing plate within the cutter and carrying engaging devices cooperating with those first named, the plate and cutter being relatively movable, and a second cutter detachably mounted within that first named.

In testimony whereof we affix our signatures.

EDWIN FULTS.
CLARENCE A. BATES.